US007730485B2

(12) United States Patent
Walter

(10) Patent No.: US 7,730,485 B2
(45) Date of Patent: Jun. 1, 2010

(54) SYSTEM AND METHOD FOR ADVERTISING TO A WI-FI DEVICE

(75) Inventor: Edward Walter, Boerne, TX (US)

(73) Assignee: AT&T Intellectual Property I, L.P., Reno, NV (US)

( * ) Notice: Subject to any disclaimer, the term of this patent is extended or adjusted under 35 U.S.C. 154(b) by 1471 days.

(21) Appl. No.: 10/915,685

(22) Filed: Aug. 10, 2004

(65) Prior Publication Data
US 2006/0036517 A1 Feb. 16, 2006

(51) Int. Cl.
*G06F 9/55* (2006.01)
(52) U.S. Cl. ............ 718/1; 235/383; 235/385; 340/5.91; 340/5.92
(58) Field of Classification Search .......... 455/95, 455/408, 422.1, 426.1, 456.1, 456.3; 235/376, 235/383, 385; 340/5.9, 5.91, 5.92; 705/7, 705/29; 707/10, 100; 709/203, 223; 718/1
See application file for complete search history.

(56) References Cited

U.S. PATENT DOCUMENTS

| | | | |
|---|---|---|---|
| 6,055,494 A * | 4/2000 | Friedman ............... 704/9 |
| 6,542,934 B1 | 4/2003 | Bader et al. |
| 6,584,375 B2 | 6/2003 | Bancroft et al. |
| 6,587,835 B1 | 7/2003 | Treyz et al. |
| 6,651,053 B1 | 11/2003 | Rothschild |
| 6,731,238 B2 | 5/2004 | Johnson |
| 6,731,940 B1 | 5/2004 | Nagendran |
| 6,742,037 B1 * | 5/2004 | Hall et al. ............. 709/228 |
| 6,795,700 B2 * | 9/2004 | Karaoguz et al. ........ 455/408 |
| 6,813,501 B2 * | 11/2004 | Kinnunen et al. ....... 455/456.2 |
| 6,870,464 B2 * | 3/2005 | Okamura ............... 340/10.51 |
| 6,909,986 B2 * | 6/2005 | Rogers et al. .......... 702/156 |
| 6,944,542 B1 * | 9/2005 | Eschenbach ............ 701/220 |
| 7,082,426 B2 * | 7/2006 | Musgrove et al. ........ 707/3 |
| 7,120,420 B2 * | 10/2006 | Karaoguz et al. ........ 455/408 |
| 7,165,722 B2 * | 1/2007 | Shafer et al. ........... 235/385 |
| 7,185,204 B2 * | 2/2007 | Narayanaswami et al. .. 713/182 |
| 7,206,753 B2 * | 4/2007 | Bancroft et al. ......... 705/10 |
| 7,225,262 B2 | 5/2007 | Macdonald et al. |
| 7,232,066 B2 * | 6/2007 | Andreasson et al. ...... 235/385 |
| 7,257,391 B2 * | 8/2007 | Burgess et al. .......... 455/414.1 |

(Continued)

OTHER PUBLICATIONS

International Search Report and Written Opinion of the International Searching Authority for International Application No. PCT/US05/25262, mailed on Nov. 20, 2007.

*Primary Examiner*—Andrew Joseph Rudy
(74) *Attorney, Agent, or Firm*—Toler Law Group

(57) ABSTRACT

A method is disclosed for providing information related to goods available for purchase in a building. The method includes establishing a plurality of boundary zones within a Wi-Fi network and storing product information related to the goods available for purchase that are located within each of the plurality of boundary zones. In a particular embodiment, a first set of product information is provided to a Wi-Fi device. The first set of product information can be specific to goods that are located in the same boundary zone as the Wi-Fi device. The location of the Wi-Fi device is monitored and movement of the Wi-Fi device between a first boundary zone and a second boundary zone is detected. A second set of product information can be provided to the Wi-Fi device after detecting the Wi-Fi device moving to the second boundary zones.

11 Claims, 6 Drawing Sheets

U.S. PATENT DOCUMENTS

| | | | |
|---|---|---|---|
| 7,346,564 B1 * | 3/2008 | Kirklin et al. | 705/28 |
| 7,379,904 B2 * | 5/2008 | Tischer | 705/26 |
| 7,380,725 B2 * | 6/2008 | McGill | 235/472.01 |
| 7,398,093 B2 * | 7/2008 | Hull et al. | 455/456.1 |
| 7,433,831 B2 * | 10/2008 | Sweeney | 705/20 |
| 2004/0122718 A1 * | 6/2004 | Baumann et al. | 705/7 |
| 2005/0177515 A1 | 8/2005 | Kalavade et al. | |

* cited by examiner

SYSTEM AND METHOD FOR ADVERTISING TO A WI-FI DEVICE

FIELD OF THE INVENTION

The present disclosure relates generally to advertisement schemes for Wi-Fi networks.

BACKGROUND

Short-range wireless data networks, e.g., wireless fidelity (Wi-Fi) networks, have become commonplace and can be found in homes, coffee shops, book stores, and other places of business. Wi-Fi standards, such as IEEE 802.11x, provide network users with mobility and easy network access. For example, a user with a Wi-Fi device can simply enter a Wi-Fi coverage area and obtain a connection in order to have access to a network. Moreover, Wi-Fi networks are relatively easy to deploy.

Advertisers and marketers have yet to provide a sophisticated, but user-friendly scheme for providing product information to Wi-Fi devices. As such, there exists a need for a system and method for advertising to a Wi-Fi device.

BRIEF DESCRIPTION OF THE DRAWINGS

The present invention is pointed out with particularity in the appended claims. However, other features are described in the following detailed description in conjunction with the accompanying drawings in which:

DETAILED DESCRIPTION OF THE DRAWINGS

Figure 1:
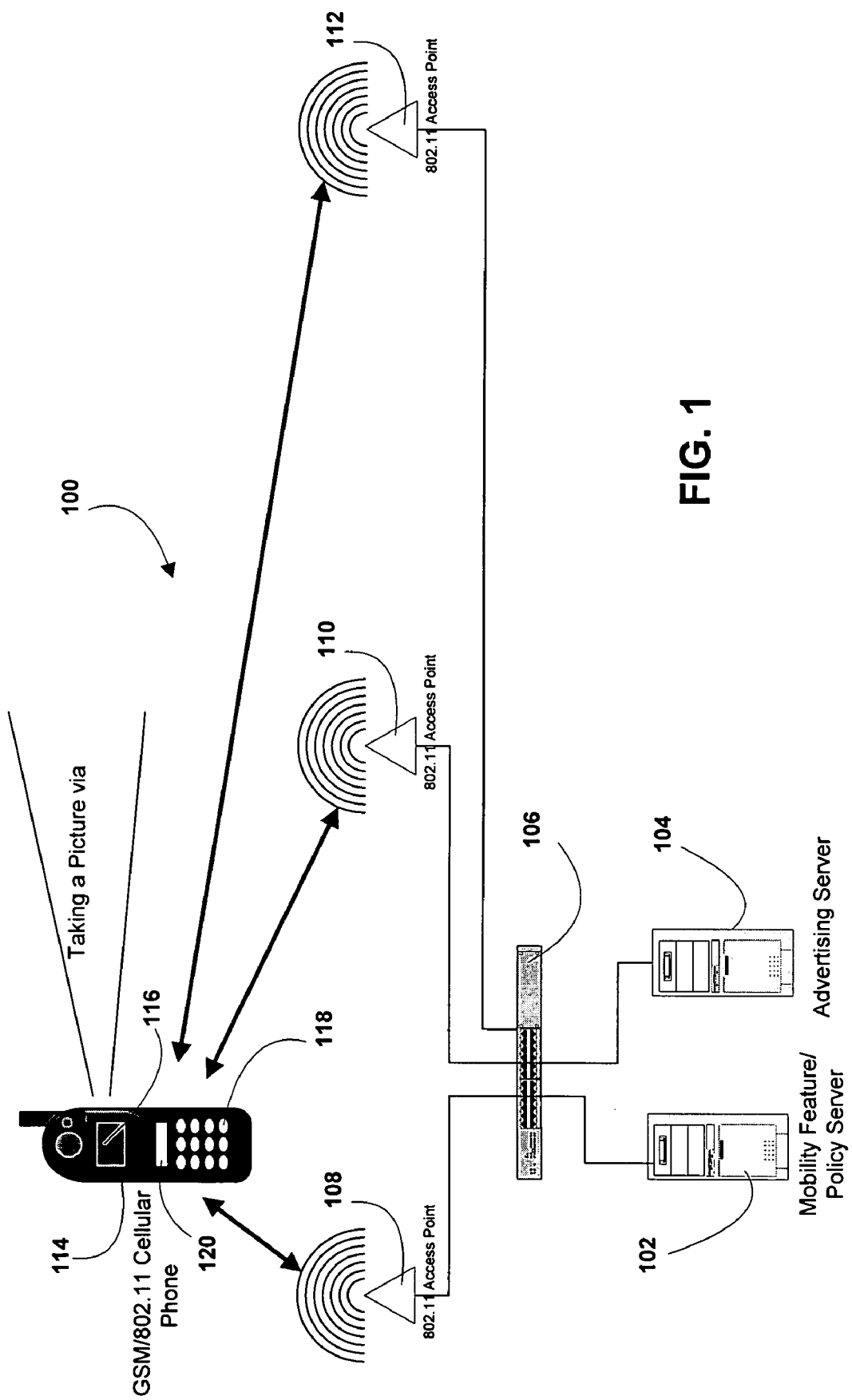
FIG. 1 is a block diagram representative of a wireless fidelity (Wi-Fi) network system.

A method is disclosed for providing information related to goods available for purchase in a building. The method includes establishing a plurality of boundary zones within a Wi-Fi network and storing product information related to the goods available for purchase that are located within each of the plurality of boundary zones. In a particular embodiment, a first set of product information is provided to a Wi-Fi device. The first set of product information can be specific to goods that are located in the same boundary zone as the Wi-Fi device. The location of the Wi-Fi device is monitored and movement of the Wi-Fi device between a first boundary zone and a second boundary zone is detected. A second set of product information can be provided to the Wi-Fi device after detecting the Wi-Fi device moving to the second boundary zones.

In an illustrative embodiment, the product information is provided to the Wi-Fi device via a graphical user interface at a display on the Wi-Fi device. The graphical user interface includes an outer boundary that represents the perimeter of the retail building and at least one graphical representation of a product shelf. Moreover, the graphical user interface includes a plurality of virtual boundary zones adjacent to the at least one graphical representation of a product shelf.

In a particular embodiment, product information is provided to the Wi-Fi device as a curser is moved between the virtual boundary zones. The product information corresponds to products available in an actual boundary zone that corresponds to the virtual boundary zone. Movement of the cursor between a first boundary zone and a second boundary zone can be detected and a second set of product information can be provided to the Wi-Fi device after detecting that the cursor has moved to the second boundary zone. In an illustrative embodiment, at least one graphical representation of a product is displayed. The graphical representation of the product corresponds to an actual product available in the retail building. Moreover, a brand image or logo can be displayed for the product. A system owner can charge to display the brand image.

In a particular embodiment, the product information can include: a price of a product, a location of a product, a route to find a product, an availability of a product, a coupon for a product, a promotion for a product, and an advertisement for a product.

In another embodiment, a Wi-Fi device includes a processor. The processor includes a computer readable medium and a computer program that is embedded within the computer readable medium. The computer program includes a plurality of virtual boundary zones. Each of the plurality of virtual boundary zones corresponds to a physical boundary zone within a Wi-Fi network. The computer program can also include instructions to display product information when the Wi-Fi device enters a Wi-Fi network.

In yet another embodiment, a system for sending and receiving retail product data is provided and includes a Wi-Fi network. The Wi-Fi network is divided into a plurality of boundary zones within a predetermined region. Further, the system can include a server that includes product data related to one or more products available within each of the plurality of boundary zones.

In still another embodiment, a system is provided for sending and receiving retail product data. The system includes a first W-Fi access point, a second Wi-Fi access point, and a third Wi-Fi access point. A switch is coupled to the first access point, the second access point, and the third access point. Moreover, the first Wi-Fi access point, the second Wi-Fi access point, and the third Wi-Fi access point can establish a Wi-Fi network. The Wi-Fi network can be divided into a plurality of boundary zones within a predetermined region. Also, the system can include a server that is coupled to the switch. The server includes product data that is related to one or more products available within each of the plurality of boundary zones.

In yet still another embodiment, a method of providing information related to goods available for purchase in a building is provided. The method includes providing remote access to a virtual store. The virtual store corresponds to the building. Further, the virtual store is divided into a plurality of virtual boundary zones. Each of the plurality of virtual boundary zones corresponds to a physical boundary zone within the building. Product information that is related to the goods available for purchase within each physical boundary zone can be displayed when a user selects at least one of the plurality of virtual boundary zones.

Referring initially to FIG. 1, a Wi-Fi network system is illustrated and is generally designated 100. As illustrated in FIG. 1, the system 100 includes a mobility feature/policy server 102 and an advertising server 104. In a particular embodiment, the mobility feature/policy server 102 includes logic for locating and monitoring a Wi-Fi device within the Wi-Fi network system 100. An example of that logic is described in detail in U.S. patent application Ser. No. 10/890, 397, filed Jul. 13, 2004, for the invention entitled "System and Method for Location Based Policy Management" by Edward Walter, which is incorporated herein by reference it its entirety. In a particular embodiment, the advertising server 104 includes logic for providing product related information to a Wi-Fi device when it enters the Wi-Fi network system 100.

As shown in FIG. 1, the mobility feature/policy server 102 and the advertising server 104 can be connected to a switch 106. Further, a first access point 108, a second access point 112, and a third access point 114 can be connected to the switch 106. In an illustrative embodiment, the access points 108, 110, 112 are Wi-Fi bases stations having Wi-Fi antennae, e.g., IEEE 802.11 antennae.

FIG. 1 also shows a Wi-Fi device 114, e.g., a (GSM) cellular telephone, an IEEE 802.11 cellular phone, a Wi-Fi portable data assistant (PDA), a Wi-Fi laptop computer, etc. The Wi-Fi device 114 can communicate with the mobility feature/policy server 112 and the advertising server 114 via one or more of the access points 118, 120, 122. As depicted in FIG. 1, the Wi-Fi device 114 can include a display screen 116 and a keypad 118. The keypad 118 includes a plurality of keys that can be pressed, or otherwise toggled, by a user during operation of the Wi-Fi device 114. The Wi-Fi device 114 further includes a microprocessor 120 having a computer readable medium. Logic can be embedded within the computer readable medium for receiving shopping information and displaying the shopping information at the Wi-Fi device 114.

Figure 2:
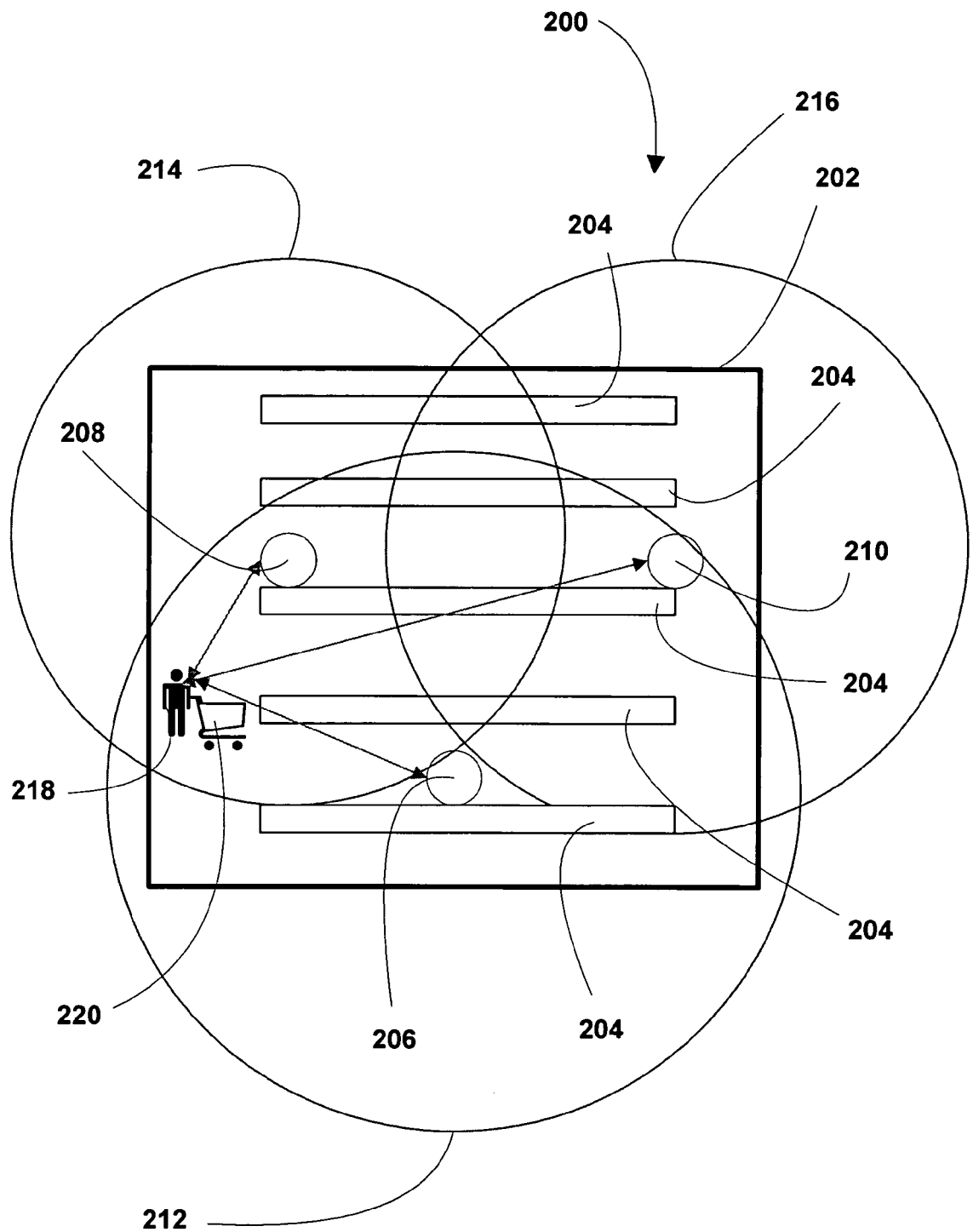
FIG. 2 is a general diagram representative of a retail shopping system including a Wi-Fi network.

FIG. 2 illustrates a retail shopping system, generally designated 200. As shown, the retail shopping system 200 includes a retail building 202 in which a plurality of shopping shelves 204 can be disposed in order to support a variety of goods that are available for purchase within a retail shopping system 200. FIG. 2 also depicts a first Wi-Fi access point 206, a second Wi-Fi access point 208, and a third Wi-Fi access point 210. The first Wi-Fi access point 206 provides a first Wi-Fi coverage zone 212. The second Wi-Fi access point 208 provides a second Wi-Fi coverage zone 214. Further, the third Wi-Fi access point 210 provides a third Wi-Fi coverage zone 216.

As illustrated in FIG. 2, the access points 206, 208, 210 are strategically placed within the retail building 202 so that the Wi-Fi coverage zones 212, 214, 216 provide complete Wi-Fi coverage throughout the retail building 202 and establish a Wi-Fi network within the retail building 202. FIG. 2 also shows a retail shopper 218 and a retail shopping cart 220. In a particular embodiment, the retail shopper 218 can move through the retail building 202 with the shopping cart 220 in order to browse the goods that are available for purchase within the retail building, i.e., the goods that are disposed on the product shelves 204.

Figure 3:
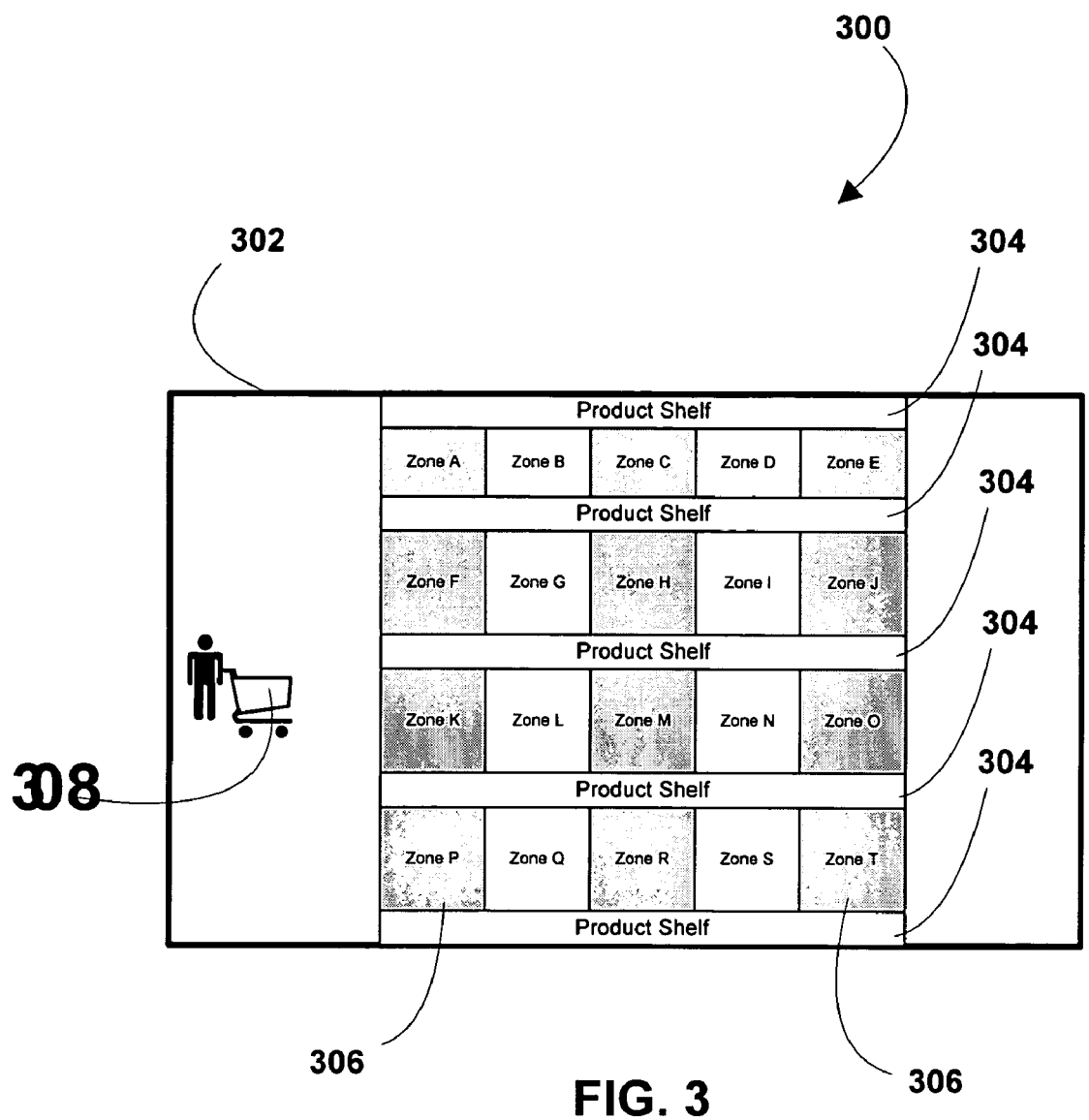
FIG. 3 is a general diagram illustrating a graphical user interface that can be used to access information regarding retail goods for sale in a building.

FIG. 3 depicts a graphical user interface 300 that can be displayed at the display screen 116 (FIG. 1) of the Wi-Fi device 114 (FIG. 1). As depicted in FIG. 3, the GUI 300 includes an outer boundary 302 that represents the perimeter of the retail building 202 (FIG. 2). Also, the GUI 300 includes a plurality of graphical representations of products shelves 304. FIG. 3 further illustrates a plurality of boundary zones 306 that are established along the aisles between adjacent product shelves 304. In an illustrative embodiment, there are five boundary zones 306 along four aisles for a total of twenty (20) boundary zones 306 that are labeled from A to T, i.e., Zone A, Zone B, Zone C . . . Zone T. More or less boundary zones 306 can be established within the GUI 300 depending on the size of the actual retail building that corresponds to the boundary 302 provided by the graphical user interface 300. As further indicated in FIG. 3, the GUI 300 can include a cursor 308 to aid in moving between the boundary zones 306 presented by the graphical user interface. In an illustrative embodiment, the cursor 308 is a shopper/cart graphic that represents a virtual shopper.

During operation, a user can select a virtual boundary zone 306 displayed at the Wi-Fi device 114 (FIG. 1) in order to obtain information related to retail goods that are located in the corresponding physical boundary zone. In a particular embodiment, the boundary zone 306 is selected by moving the shopper/cart graphic 308 into the boundary zone 306 of interest. The product information can include price, availability, location, promotions, coupons, etc.

Figure 4:
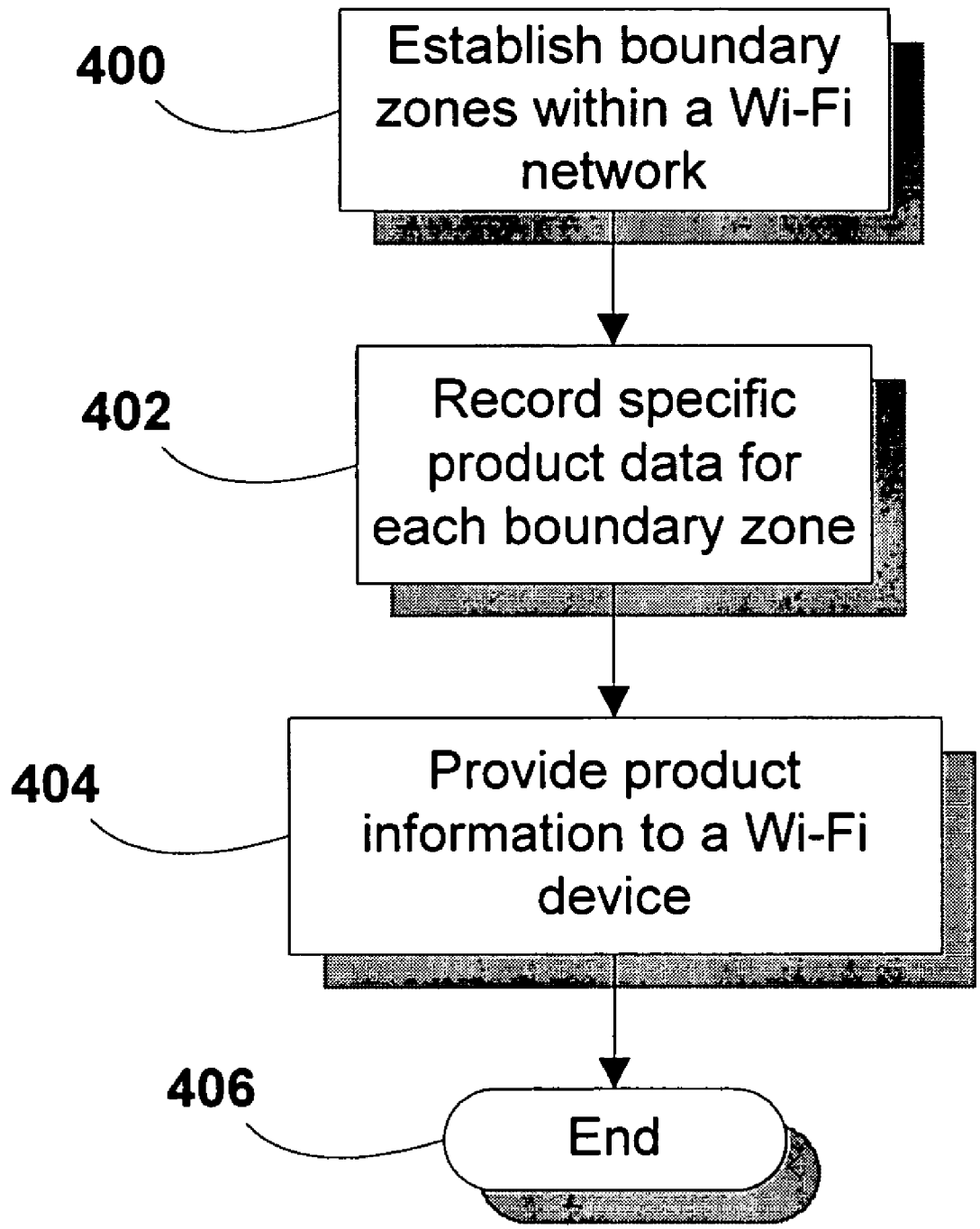
FIG. 4 is a flow chart illustrating general configuration logic.

Referring to FIG. 4, an illustrative embodiment of general configuration logic is shown commencing at block 400 where a plurality of boundary zones are established within a Wi-Fi network. At block 402, specific product data is recorded for each boundary zone that corresponds to the specific retail goods that are available within each boundary zone. The product data can include price, location, availability, advertisements, promotions, coupons, etc. Moving to block 404, the product information is provided to a Wi-Fi device. The logic then ends at state 406.

Figure 5:
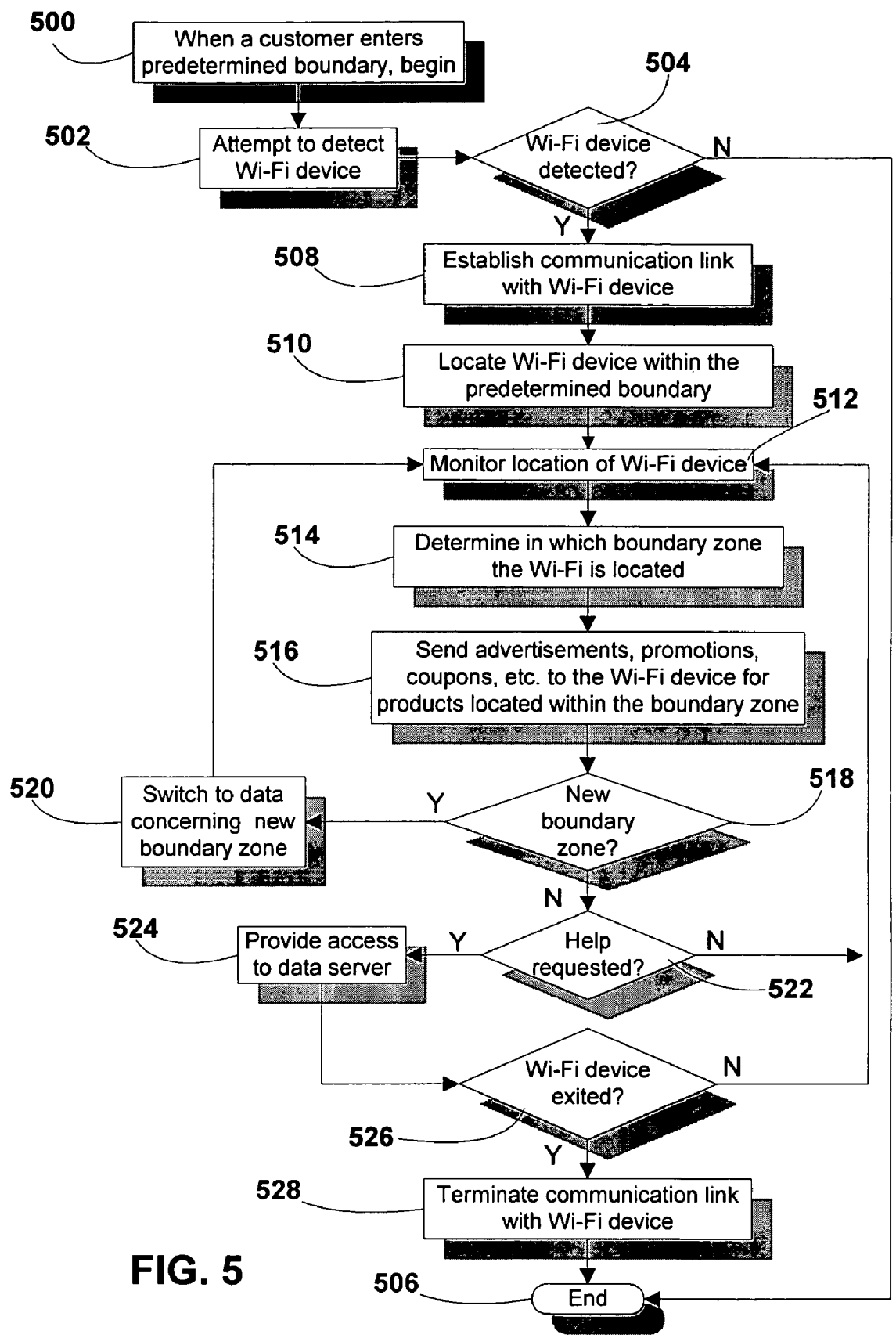
FIG. 5 is a flow chart illustrating logic that can be used to provide information regarding retail goods to a shopper within a retail building via a Wi-Fi device.

FIG. 5 is a flow chart illustrating logic that can be used to provide information regarding retail goods to a shopper within a retail building. Beginning at block 500, the following steps are performed when a customer enters a predetermined boundary. In an illustrative embodiment, the boundary is the perimeter of the retail building 202 (FIG. 2). Moving to block 502, an attempt is made to detect a Wi-Fi device, e.g., the Wi-Fi device 114 portrayed in FIG. 1. At decision step 504, a decision is made in order to determine whether a Wi-Fi device 114 (FIG. 1) is detected. If a Wi-Fi device 114 (FIG. 1) is not detected, the logic ends at state 506. On the other hand, if a Wi-Fi device 114 (FIG. 1) is detected, the logic proceeds to block 508 and a communication link is established with the Wi-Fi device 114 (FIG. 1).

Moving to block 510, the Wi-Fi device 114 (FIG. 1) is located within the predetermined boundary. At block 512, the location of the Wi-Fi device 114 (FIG. 1) is monitored. Thereafter, the boundary zone in which the Wi-Fi device 114 (FIG. 1) is located is determined at block 514. Proceeding to block 516, product information is sent to the Wi-Fi device 114 (FIG. 1). In an illustrative embodiment, the product information corresponds to products that are located within the actual detected physical boundary zone in which the Wi-Fi device 114 (FIG. 1) is currently located.

Continuing to decision step 518, a determination is made in order to ascertain whether the user, and the corresponding Wi-Fi device 114 (FIG. 1), have entered a new boundary zone. If so, the logic moves to block 520 and the system switches to data concerning the new boundary zone in which the Wi-Fi device 114 (FIG. 1) is located. The logic then returns to block 512 and continues as described above. If a new boundary zone is not entered at decision step 518, the logic proceeds to decision step 522 and a decision is made in order to determine whether help is requested. If help is not requested, the logic returns to step 512 and continues as described above.

If help is requested, the logic continues to block 524 and access is provided to a help server, e.g., the advertising server 114 shown in FIG. 1. Using the help feature, a user can locate specific products anywhere in the store, determine if a product of interest is available anywhere in the store, find out if any coupons are available, determine if a product is on sale, etc. Moving to at decision step 526, a decision is made to determine if the Wi-Fi device 114 (FIG. 1) has exited the predetermined boundary, e.g., the perimeter of the retail building 202 (FIG. 2). If the Wi-Fi device 114 (FIG. 1) is still within the predetermined boundary the logic returns to block 512 and continues as described as above. If the Wi-Fi device 114 (FIG. 1) exits the predetermined boundary, the logic moves to block 528 and the connection to the Wi-Fi device 114 (FIG. 1) is terminated. The logic ends at state 506.

Figure 6:
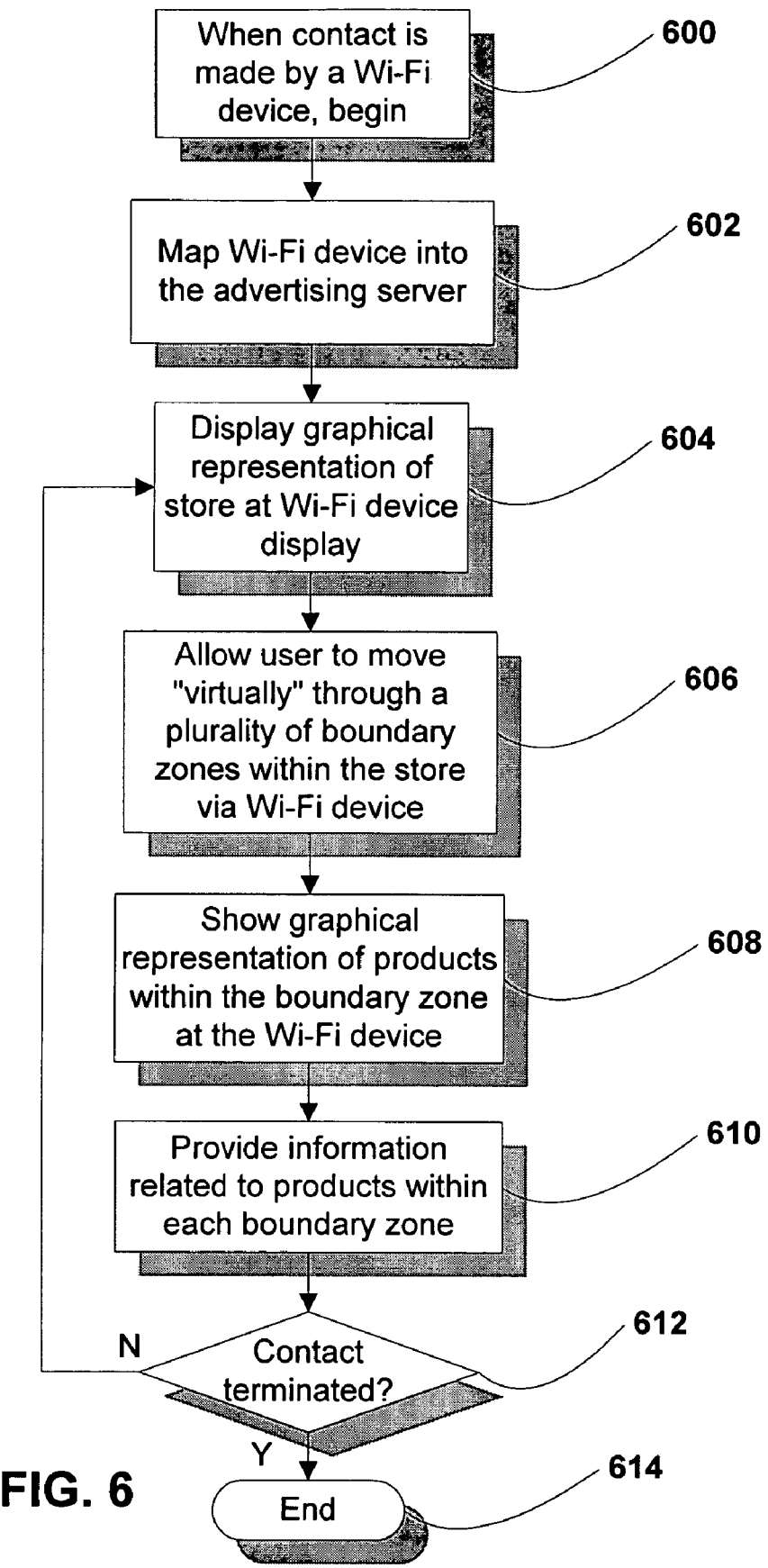
FIG. 6 is a flow chart illustrating logic that can be used to provide information regarding retail goods to a virtual shopper via a Wi-Fi device.

Referring now to FIG. 6, a flow chart illustrating logic that can be used to provide information regarding retail goods to a virtual shopper is shown and commences at block 600 when contact is made by a Wi-Fi device 114 (FIG. 1). The contact can be made through a telephone connection, a wireless Internet connection, or a Wi-Fi connection. At block 602, the Wi-Fi device 114 (FIG. 1) is mapped into the advertising server. Moving to block 604, a graphical representation of the retail building, e.g., the GUI 300 shown in FIG. 3, is displayed at the display 116 (FIG. 1) of the Wi-Fi device 114 (FIG. 1). At block 606, a user is allowed to move "virtually" through a plurality of boundary zones within the retail building via the Wi-Fi device 114 (FIG. 1). Next, graphical representations of products within each boundary zone are displayed at the Wi-Fi device 114 (FIG. 1) as the user moves "virtually" through the boundary zones.

Proceeding to block 610, information related to products within each physical boundary zone corresponding to each virtual boundary zone is provided. At decision step 612, a determination is made in order to ascertain whether the contact has been terminated by the user. If the contact is not terminated, the logic returns to block 604 and continues as described above. If the contact is terminated by the user, the logic ends at state 614.

With the configuration of structure described above, the system and method for advertising to a Wi-Fi device provides a method to transmit specific product data to a Wi-Fi device that corresponds to products located in a specific physical boundary zone established within a Wi-Fi network. The system can accurately identify the location of a store patron within the Wi-Fi network. In an illustrative embodiment, the boundary zones are defined by a store owner. A patron location may be determined by triangulating a Wi-Fi device signal using three or more access points. The detected location may be compared to the perimeter of each zone established within the Wi-Fi network to identify a patron location and a current zone.

The system can also identify specific products that are physically located and mapped in relation to a store patron. This requires the use of a store's "product location" database, i.e., the advertising server. In a particular embodiment, the advertising server can store coordinates for each individual item within the store. As a patron approaches the coordinates of a specific product, advertisements, promotional information, and product information can be displayed on his or her Wi-Fi device. Further, since the coordinates are known for each product within the store, and the location of the patron is known, directions can be provided to the products.

The system automates the ability to find products within a store and saves valuable labor resources that can be used to perform other tasks. In addition, the system allows for increased benefit over manually asking for directions. For example, a shopping list can be input into a search engine via the Wi-Fi device and the quickest route for locating all of the available products on the shopping list can be mapped for the customer and displayed at the Wi-Fi device. Thus, the customer's time in the store is used most efficiently.

Moreover, in a particular embodiment, the present system can provide product branding at the Wi-Fi device and companies can pay to have their advertisements displayed at the Wi-Fi device while they are within a particular store or within a particular area of a store. For example, if a store patron is located in the shoe department of a particular store one or more advertisements for Nike can be presented to the user at the Wi-Fi device. Also, in another particular embodiment, the present system can allow a user to purchase goods via the Wi-Fi device and avoid having to spend time in a check-out line. Further, in a particular embodiment, a user can point, or move, his or her Wi-Fi device near a particular product to get information about that product.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A wireless-fidelity (Wi-Fi) device, comprising:
 a processor, the processor comprising a computer readable medium and a computer program embedded within the computer readable medium, the computer program comprising:
 instructions to display a plurality of virtual boundary zones, each of the plurality of virtual boundary zones corresponding to a physical boundary zone within a Wi-Fi network; and
 instructions to display product information associated with a particular virtual boundary zone when the Wi-Fi device enters the particular physical boundary zone corresponding to the particular virtual boundary zone of the Wi-Fi network.

2. The device of claim 1, wherein the computer program further comprises:
 instructions to display a graphical user interface, the graphical user interface providing access to the product information.

3. The device of claim 2, wherein the computer program further comprises:
 instructions to display an outer boundary representing a perimeter of a building; and
 instructions to display at least one graphical representation of a product shelf.

4. The device of claim 3, wherein the computer program further comprises:
 instructions to display at least one of the plurality of virtual boundary zones adjacent to the at least one graphical representation of the product shelf.

5. The device of claim 4, further comprising:
 instructions to provide product information specific to retail goods corresponding to the plurality of virtual boundary zones as a cursor is moved between different virtual boundary zones displayed at the graphical user interface.

6. The device of claim 5, further comprising:

instructions to receive product information at the Wi-Fi device as the cursor is moved between the different virtual boundary zones.

7. The device of claim 6, further comprising:

instructions for displaying at least one graphical representation of a product, the graphical representation of the product corresponding to an actual product available in the retail building.

8. The device of claim 7, wherein the product information includes at least one of: a price, a location, a route from a location of the Wi-Fi device to a product location, an availability, a coupon, a promotion, and an advertisement.

9. The device of claim 6, wherein the cursor includes a shopper cart graphic that represents a virtual shopper.

10. The device of claim 1, further comprising instructions to wirelessly receive help information from a network element.

11. The device of claim 10, wherein the help information enables a user to locate a product, determine product availability, determine coupon availability for a product, determine if a product is on sale, or any combination thereof.

* * * * *